United States Patent Office
3,050,383
Patented Aug. 21, 1962

3,050,383
FERTILIZER
Joseph F. Wilson, Bartlesville, Okla., assignor to Phillips Petroleum Company, a corporation of Delaware
No Drawing. Filed July 10, 1958, Ser. No. 747,586
12 Claims. (Cl. 71—11)

This invention relates to the production of a novel fertilizer composition. In one aspect, it relates to a method of granulating relatively low analysis organic waste material in such a manner as to upgrade the plant nutrient value thereof and render it relatively free-flowing or granular. In another aspect, it relates to a high analysis, relatively dust-free, granular fertilizer product.

The plant nutrient value of organic fertilizer material derived from animal and plant waste, such as dried manure and sewage, has long been recognized. This fertilizer material contains inorganic nutrients such as nitrogen and phosphorus, trace elements such as manganese and boron, and organic material which is desirable for conditioning the soil. However, the plant nutrient value of this fertilizer material is generally of a low order, this material being generally called low analysis fertilizer material, the amount of inorganic nutrients being frequently below ten percent by weight. Moreover, this type of fertilizer material is generally finely divided and relatively dusty, properties which limit its application in the field. The individual particles are not spherical or of a uniform size, and the material generally is not free-flowing. Because of the low plant nutrient value of this material and its poor physical properties, the use of synthetic inorganic fertilizer materials are supplanting the use of this organic fertilizer waste material in a general trend toward high analysis fertilizers which can be readily distributed in the field.

Accordingly, an object of this invention is to provide a novel fertilizer composition. Another object is to provide a method of granulating relatively low analysis, organic waste fertilizer material in such a manner as to upgrade the plant nutrient value thereof. Another object is to provide a method of granulating low analysis organic waste, such as dried manure and sewage sludge, in such a manner as to render the fertilizer material granular or free-flowing. Another object is to provide a relatively high analysis, dust-free granular fertilizer product which can be readily distributed in the field. Another object is to provide a novel fertilizer by making use of relatively low analysis and low cost fertilizer materials. Another object is to provide novel fertilizer compositions having a wide range of analyses. Another object is to provide a fertilizer characterized by its well-defined and uniformly-shaped granules. Further objects and advantages of this invention will become apparent from the following discussion and appended claims.

In the fertilizer trade, the plant nutrient value, grade, or analysis, of a fertilizer material is generally expressed in the relative amounts of nitrogen, expressed as N, phosphorus, expressed as $P_2O_5$, and potassium, expressed as $K_2O$; thus, a 10–15–25 fertilizer contains 10 percent nitrogen as N, 15 percent phosphorus as $P_2O_5$, and 25 percent potassium as $K_2O$. These designations are used in this specification and the appended claims.

Broadly, I have discovered that relatively low analysis, dusty, organic waste fertilizer material, such as dried animal manure and sewage sludge, can be granulated and upgraded in plant nutrient value by admixing the same with controlled amounts of an acid, such as sulphuric or phosphoric acid, or mixtures of these acids, and an aqueous ammoniacal solution, such as aqueous ammonia or ammoniacal nitrogen salt-containing solutions, and tumbling the resulting reaction mass to effect the formation of uniformly shaped, well-defined granules of fertilizer. The acid and aqueous ammoniacal solution preferably are added and mixed with the organic waste material simultaneously, and employed in amounts sufficient to insure the formation of a granular product. Generally, the amounts of acid and ammoniacal solution will be sufficient so as to provide at least 30 to 40 weight percent nitrogen-containing salts, based on the final granular product. To promote or control granulation, it will often be desirable to blend preliminarily the organic waste material with a small amount of water. Because of the ensuing reaction between the acid, ammoniacal solution, and organic waste, and the consequent generation of heat of ammoniation, inorganic nitrogen-containing salts are formed or crystallized in situ, these salts aiding the granulation of the reaction mass upon tumbling the same. In order to prevent the reaction mass from igniting or presenting a fire hazard, it is preferred to maintain the mixing and granulation operation at a temperature below about 300° F.

The organic waste material or natural organics treated according to the practice of this invention includes such low analysis materials as animal manure, sewage sludge, tankage, fish scraps, dried blood, bone meal, hoof meal, rendered kitchen wastes, leather scraps, hair, feathers, soybean meal, rice hulls, peanut hull meal, peat, tobacco stems, cocoa shell, meal, etc. Hereinafter the expression "a low analysis organic waste material selected from the group consisting of industrial organic wastes, sewage sludge, and animal manure" is intended to include the low analysis materials such as herein mentioned. A commercially available activated sewage sludge which can be used in milorganite: moisture, less than 5 percent; nitrogen, 5.3–6.2 percent; total phosphoric acid, $P_2O_5$, 3–5 percent; and available $P_2O_5$, 2–3 percent. The organic waste preferably is ground, shredded or otherwise comminuted so as to pass through a mesh screen of about 4 mesh, and preferably has been dried so as to have a moisture content between about 2 and 15 weight percent. This organic waste starting material generally will have a plant nutrient value of about 2–2–0, although organics as low as 1–1–0, or lower, can be used. The dried, comminuted organic waste starting material is generally employed in an amount so as to comprise 15 to 75 weight percent (on a dry basis) of the reactants.

As mentioned hereinbefore, the organic waste is simultaneously reacted with an acid and with an aqueous ammoniacal solution. The liquid reactants can be added continuously or serially in portions. The acids which can be used in the practice of this invention include sulfuric and phosphoric acid. The use of sulfuric acid is preferred and this acid preferably has a concentration of greater than 90 percent, particularly useful concentrations being in the range of between about 93 and 100 percent such as commercially available sulfuric acid having a concentration of 66° Baumé. Where phosphoric acid is employed, this acid will have a concentration between about 78 and 85 percent and can be phosphoric acid derived by the so-called wet process. It is, of course, within the scope of this invention to utilize mixtures of these two acids. The amount of acid employed in the practice of this invention is that amount sufficient to neutralize all ammonia in the reaction mass which is in excess of that required to neutralize other acidic ingredients, such as $P_2O_5$, in the reaction mixture. In the neutralization of ammonia, approximately one mol of sulfuric acid, or of phosphoric compounds, expressed as phosphoric acid, is used for each 2 mols of ammonia. Theoretically, 2.9 parts by weight of sulfuric acid or of phosphoric acid are employed for each part by weight of the ammonia in the reaction mass. However, exact neutralization is not necessary and amounts of about 2.5 to 6 parts of acid for each part by weight of free ammonia can be employed.

The ammoniacal solutions useful in the practice of this invention include aqueous ammonia, e.g., 28 percent ammonia, and ammoniacal nitrogen-containing solutions, the latter containing nitrogen salts such as ammonium nitrate, amomnium chloride, ammonium sulfate, ammonium chloride, ammonium phosphate, and the like, and/or organic nitrogen compounds such as urea, guanidine, guanidine nitrates, and the like. Nitrogen solutions of this nature are commercially available, such as those sold under trade names Phillips 66 Nitrogen Solutions, Barrett Standard Nitrogen Solutions, Spensol Solution, Lions Nitrogen Solution, and those sold by E. I. du Pont de Nemours and Company. Suitable commercially available nitrogen solutions useful in the practice of this invention have the following compositions in weight percent:

| Composition | Nitrogen solution, weight percent | | | | | |
|---|---|---|---|---|---|---|
| | 1 | 2 | 3 | 4 | 5 | 6 |
| Total nitrogen | 41.0 | 41.0 | 39.0 | 45.2 | 47.1 | 41.4 |
| Nitrate nitrogen | 11.5 | 9.78 | 11.65 | 11.90 | 11.2 | 12.9 |
| Ammonia nitrogen | 29.51 | 31.25 | 25.35 | 33.27 | 35.9 | 28.5 |
| Ammonium nitrate | 65.7 | 55.9 | 66.8 | 68.0 | 64.0 | 74.0 |
| Anhydrous ammonia | 21.9 | 26.1 | 16.6 | 26.0 | 30.0 | 19.0 |
| Water | 12.4 | 18.0 | 16.6 | 6.0 | 6.0 | 7.0 |

These ammoniacal solutions can contain other plant nutrients such as potassium salts, e.g., potassium chloride, dissolved in the solutions. These ammoniacal solutions preferably contain less than about 20 weight percent water, and may be as much as 40 weight percent of water. These solutions have dissolved therein at least 15 weight percent free ammonia. The amount of the ammoniacal solutions employed in the practice of this invention will be that sufficient to provide ammonia in the amount of about 2 to 20 weight percent of the reaction mixture. In some cases, anhydrous ammonia can be used where the organic waste is preliminarily wetted with a sufficient amount of water.

While high analysis fertilizers, having uniformly-shaped and well-defined granules, can be prepared according to the practice of this invention by the admixture of the organic waste with the acid and amomniacal solution, other solid, inorganic fertilizer materials can be added either by blending them with the organic waste raw material or by adding them to the reaction mass. These other supplemental inorganic fertilizer ingredients include such plant nutrients as superphosphate (18–20 percent $P_2O_5$), triple superphosphates (45–50 percent $P_2O_5$), ground phosphate rock such as apatite, potash materials such as muriate of potash (50–60 percent $K_2O$) and kainite (12.5 percent $K_2O$), and compounds containing trace elements such as iron, zinc, copper, molybdenum and manganese in water soluble form, and inert fillers such as ground rock, sand, diatomaceous earth and clay. These other fertilizer ingredients can comprise as much as 50 weight percent of the reaction mixture.

In the production of fertilizers according to the practice of this invention, the organic waste such as animal manure (e.g., 0.5–0.25–0.5 $N-P_2O_5-K_2O$) or sewage sludge (e.g., 2.5–2.5–0 $N-P_2O_5-K_2O$) is first prepared. Where other inorganic fertilizer materials such as triple superphosphate are employed, these other solid ingredients are uniformly blended with the organic waste. This conveniently can be done in a rotating or tumbling drum, or other type of mixer. The moisture content of the organic waste raw material can be adjusted to a value in the range of about 5 to 15 weight percent by either drying the organic material to drive off the excessive moisture, or if the moisture content is less than 5 percent the necessary amount of water can be added by spraying the reactant material in the drum. The moisture content of the blend of solid reactants promotes or aids in controlling the granulation process. When a uniformly blended mixture of solid reactants is prepared having the proper moisture content, this blend is admixed with the acid and ammoniacal solution. Preferably the acid and ammoniacal solution are simultaneously added to the tumbling solid blend through separate nozzles or spargers, so as to uniformly wet the solid material. The preferred way of adding the acid and ammoniacal solution is by spraying them through a bed of the solid reactants. The acids and ammoniacal solution are added at a rate sufficiently slow so as to maintain the temperature of the reaction mass below about 300° F., preferably below about 290° F. Cooling coils can be employed to increase the rate of dissipation of the heat of reaction but frequently the mixing can be affected within ten minutes while maintaining the temperature within the desired range of 190 to 290° F., more preferably between about 212 to 240° F. The resulting reaction mass or mixture is then tumbled to effect the granulation of the fertilizer product. Generally, this mass can be tumbled for a period between about 0.5 to 5 minutes, or longer.

During the initial mixture of the reactants and while granulating the resulting reaction mass, some drying of the product can be effected, but this is not necessary to obtain good granulation. Drying can be effected subsequent to granulation by maintaining a temperature preferably between about 200 to 260° F. A drum drier with a countercurrent stream of dry air or other inert gas can be conveniently employed to obtain a product having a satisfactory low moisture content, e.g., a moisture content less than about 10 weight percent. The dry, granulated product will usually comprise granules of uniform shape, and, if desired, the product can be classified so as to obtain granular products having various size ranges. Any oversize material can be crushed in a suitable hammer mill or the like and fines can be recycled to the mixing or tumbling steps of the process.

The plant nutrient values of the granular fertilizer products of this invention can vary over a wide range. Typical of these fertilizer products are those having the following $N-P_2O_5-K_2O$ compositions:

2–2–0     2–2–2
2–5–0     2–5–2
5–10–0    5–10–5
10–10–0   10–10–10
16–16–0   16–16–16
16–48–0   16–48–16

A fuller understanding of this invention will be gained from the following examples which illustrate preferred methods of carrying out the practice of this invention and illustrate the advantages and objects thereof; but it should be understood that this invention is not necessarily limited to the specific ingredients, amounts, ranges, etc., described in the examples for illustrative purposes.

In these examples, the "total water" reported was computed from the moisture and water contents of the reactants and the known amounts of added water, and the "inorganic salt content" of the product reported designates those salts, such as ammonium sulfate, resulting from the reaction of ammonia and the acid, and those salts, such as ammonium nitrate, added with the ammonical solution, this salt content being reported in weight percent, on a dry basis.

In these examples, the reactions were effected in a gallon rotatable drum, approximately 7 inches in diameter. The drum was rotatable at a rate of 76 r.p.m. by means of an attached gear box and motor assembly. Means were provided for introducing the acids and ammoniacal solution along the bottom of the drum through two separate spargers. The two spargers, of ⅛ inch tubing, were ¼ to 1 inch apart. A thermocouple was used to measure the temperature of the reaction mixtures.

EXAMPLE I

Two different granular fertilizer products were made by treating sewage sludge with anhydrous ammonia and sulfuric acid (93 percent). The sewage sludge used was obtained from Houston, Texas, and was a 2.5–2.5–0 fertilizer having a moisture content of 2.6 percent, and it had the following cumulative screen analysis: 1.7 percent greater than 14 mesh; 12.4 percent greater than 20 mesh; and 87.6 percent less than 20 mesh. In one run, designated "A," the sewage sludge was first blended with water and then a small amount of the acid, about 15 ml., was first added to the moistened sewage sludge, followed by simultaneous addition of the remaining acid and the anhydrous ammonia. In both runs, the resulting reaction mass was tumbled continuously during the addition of the acid and anhydrous ammonia, and tumbling was continued two minutes after the addition of these materials was complete. In both runs, good granular products were obtained. The amounts of the ingredients of these two runs, and other pertinent product data are set forth in Table I, and the screen analyses of these two products are set forth in Table II.

Table I

|  | Runs | |
|---|---|---|
|  | A | B |
| Sewage sludge, g | 700 | 700 |
| Anhydrous ammonia, g | 100 | 100 |
| Sulfuric acid, g | 321 | 321 |
| Water (added), g | 70 | 0 |
| Total water, parts/100 parts reactants | 11 | 4.5 |
| Inorganic salt content of product, wt. percent | 36.4 | 36.4 |
| $N-P_2O_5-K_2O$ analysis of product | 5.3-1.6-0 | 5.3-1.6-0 |

Table II

| Size | Cumulative weight percent | |
|---|---|---|
|  | Run A | Run B |
| Greater than 4 mesh | 2.7 | 0.3 |
| Greater than 6 mesh | 9.9 | 2.4 |
| Greater than 12 mesh | 40.3 | 38.6 |
| Greater than 20 mesh | 62.4 | 54.5 |
| Greater than 40 mesh | 84.6 | 78.4 |
| Less than 40 mesh | 15.4 | 21.6 |

EXAMPLE II

Two different fertilizer products were prepared by granulating sewage sludge (same as used in Example I) with sulfuric acid (93 percent) and nitrogen solution (No. 3 in the foregoing table of nitrogen solutions). In one run, designated "C," the sewage sludge was preliminarily blended with water in the rotating drum, while in the other run, designated "D," the water was omitted. In both runs, the nitrogen solution and the acid were simultaneously added over a period of 2 to 5 minutes. In run C, the maximum temperature during the mixing period was 216° F. and in run D, the maximum temperature during the mixing process was increased to 226° F. In each run, the reaction mass was tumbled for 10 minutes. In run C, a granular product resulted, while in run D, a product of low granularity resulted. The amounts of ingredients of these two runs, and other pertinent product data are set forth in Table III and the screen analyses of these two products are set forth in Table IV.

Table III

|  | Runs | |
|---|---|---|
|  | C | D |
| Sewage sludge, g | 700 | 700 |
| No. 3 nitrogen solution, g | 243 | 243 |
| Sulfuric acid, g | 124 | 124 |
| Water (added), g | 53 | 0 |
| Total water, parts/100 parts reactants | 11.4 | 6.7 |
| Inorganic salt content of product, wt. percent | 31.5 | 31.5 |
| $N-P_2O_5-K_2O$ analysis of product | 10.7-1.7-0 | 10.7-1.7-0 |
| Moisture content of product, wt. percent | 12.5 | 6.6 |

Table IV

| Size | Cumulative weight percent | |
|---|---|---|
|  | Run C | Run D |
| Greater than 4 mesh | 6.5 | 1.5 |
| Greater than 6 mesh | 8.75 | 3.8 |
| Greater than 14 mesh | 16.25 | 14.3 |
| Greater than 20 mesh | 36.8 | 33.1 |
| Less than 20 mesh | 63.2 | 66.9 |

EXAMPLE III

In one run, designated "E," a mixture of dried organic sewage sludge and triple superphosphate (46.2 percent $P_2O_5$, 2.3 percent moisture) was blended in a rotating drum and moistened with water. In the other run, designated "F," the sewage sludge used was the same as that used in Example I. In each run, the blend of sewage sludge and triple superphosphate were reacted with nitrogen solution (No. 5 in the foregoing table of nitrogen solutions) and sulfuric acid (93 percent), the latter materials being added simultaneously over an interval of 35 to 45 seconds, the maxium temperature during the reaction being about 260° F. The reaction masses were both granulated by tumbling for 30 minutes and good granular products were obtained. The amounts of ingredients in both of these runs, as well as other pertinent product data are set forth in Table V, and the screen analyses of these products are set forth in Table VI.

Table V

|  | Runs | |
|---|---|---|
|  | E | F |
| Sewage sludge, g | 308 | 308 |
| No. 5 nitrogen solution, g | 245 | 245 |
| Sulfuric acid, g | 136 | 136 |
| Triple superphosphate, g | 308 | 308 |
| Water (added), g | 20 | 30 |
| Total water, parts/100 parts reactants | 5.9 | 6.9 |
| Inorganic salt content of product, wt. percent | 36.9 | 36.9 |
| $N-P_2O_5-K_2O$ analysis of product | 12.8-15.3-0 | 12.8-15.3-0 |

Table VI

| Size | Cumulative weight percent | |
|---|---|---|
|  | Run E | Run F |
| Greater than 4 mesh | 5.4 | 4.3 |
| Greater than 6 mesh | 10.0 | 14.2 |
| Greater than 12 mesh | 33.8 | 40.4 |
| Greater than 14 mesh | 38.8 | 44.1 |
| Greater than 20 mesh | 75.9 | 66.0 |
| Greater than 40 mesh | 95.3 | 90.8 |
| Greater than 50 mesh | 97.5 |  |
| Greater than 80 mesh | 99.5 |  |

EXAMPLE IV

Two fertilizer products were prepared by granulating a dried fibrous manure (obtained from Organics, Inc., of Brighton, Colorado), having a moisture content of 4.0 weight percent and a screen analysis as follows: 0.7 percent greater than 20 mesh, 15.1 percent between 20 and 40 mesh, and 83.9 percent less than 40 mesh. In both runs, the manure was charged to a rotary reaction vessel together with single superphosphate (20 percent $P_2O_5$) and muriate of potash (60 percent pure). In one of the runs, designed "G," triple superphosphate was also blended with the manure while in the other run, designated "H," it was omitted. In both runs, the dry, solid ingredients were mixed with water and tumbled for about 30 minutes to obtain a uniform blend of solid reactants. The resulting blend of solid materials were then reacted with sulfuric acid (93 percent) and No. 5 nitrogen solution (same as used in Example III), the materials being added simultaneously to the solid blends. In run G, the maximum temperature of the mixture in the reaction vessel was recorded as 248° F., and in run H, the temperature reached 239° F. In both runs, good granular products were obtained. The amounts of ingredients of these two runs and other pertinent product data are set forth in Table VII, and screen analyses of these products are set forth in Table VIII.

*Table VII*

|  | Runs | |
|---|---|---|
|  | G | H |
| Manure, g | 200 | 200 |
| No. 5 nitrogen solution, g | 195 | 141 |
| Sulfuric acid, g | 135 | 78 |
| Single superphosphate, g | 183 | 199 |
| Triple superphosphate, g | 79.5 | 0 |
| Muriate of potash, g | 122 | 43.7 |
| Water (added), g | 28 | 28 |
| Total water, parts/100 parts reactants | 6.4 | 7.9 |
| Inorganic salt content of product, wt. percent | 34.7 | 32 |
| N–$P_2O_5$–$K_2O$ analysis of product a | 10.3–8.3–8.7 | 10.3–6.3–4.2 | a Neglecting nutrient value of manure raw material.

*Table VIII*

| Size | Cumulative weight percent | |
|---|---|---|
|  | Run G | Run B |
| Greater than 4 mesh | 4.1 | 10.1 |
| Greater than 6 mesh | 10.1 | 12.5 |
| Greater than 12 mesh | 27.3 | 22.6 |
| Greater than 20 mesh | 46.4 | 39.5 |
| Greater than 40 mesh | 69.3 | 62.4 |
| Less than 40 mesh | 30.7 | 37.6 |

EXAMPLE V

The effect of using water alone on organic waste material was determined by the following series of runs. In each of these runs, the same amount of sewage sludge (same as sludge used in Example I) was moistened with a measured amount of water, allowed to stand for one hour in a closed system to achieve homogeneous water distribution, and then tumbled for one hour, stopping the tumbling from time to time to inspect the sewage for granulation. Three of the runs were made at room temperature, the other at 122° F. In no case was any granulation observed. The relative amounts of sewage sludge and water are set forth in Table IX.

*Table IX*

|  | Runs | | | |
|---|---|---|---|---|
|  | I | J | K | L |
| Sewage sludge, g | 500 | 500 | 500 | 500 |
| Water (added), g | 5 | 20 | 50 | 75 |

EXAMPLE VI

The effects of using insufficient amounts of nitrogen solutions and sulfuric acid on different sewage sludges were determined by the following runs. In one run, designated "M," sewage sludge (a 2.5–2.5–0 fertilizer obtained from Oklahoma City, Oklahoma, having a moisture content of 3.2 percent) was treated with No. 5 nitrogen solution (same as used in Example III) and sulfuric acid (93 percent), these materials being simultaneously added while tumbling the sewage sludge, the time for addition covering a period of eight minutes. In this run, tumbling was continued for 2 minutes after the final addition of the other materials and the maximum temperature was 260° F. No substantial granulation was observed.

In the other run, designated "N," sewage sludge (same as used in Example I) was treated with the aforementioned No. 5 nitrogen solution and sulfuric acid (93 percent), these materials being simultaneously added while tumbling the sludge. After addition was complete, tumbling was continued for 2 minutes, the maximum temperature during the mixture being about 214° F. No appreciable granulation was observed.

The relative amounts of ingredients in these two examples, and other pertinent product data are set forth in Table X.

*Table X*

|  | Runs | |
|---|---|---|
|  | M | N |
| Sewage sludge, g | 1,260 | 700 |
| No. 5 nitrogen solution, g | 131 | 100 |
| Sulfuric acid, g | 125 | 93 |
| Total water, parts/100 parts reactants | 13.5 | 3.5 |
| Inorganic salt content of product, wt. percent | 17.6 | 21.0 |

EXAMPLE VII

The need for control of the reaction temperature is illustrated by the following example. Sewage sludge (same as used in run M of Example IX), was rapidly mixed in a few seconds with No. 5 nitrogen solution (same as used in Example III) and sulfuric acid (93 percent). The mixing was effected in the gallon-size rotating drum previously described. When the temperature reached about 300° F., spontaneous and self-sustaining ignition of the reaction mass took place and the temperature thereof rose to more than 500° F. within four seconds. The reaction was accompanied by dense white fumes but no visible flame.

Various modifications and alterations of this invention become apparent to those skilled in the art from the foregoing discussion and it should be understood that the latter and the examples illustrate only preferred embodiments of this invention and the latter should not be unduly limited thereto.

I claim:

1. A method of producing a high analysis granular fertilizer, which comprises substantially simultaneously admixing low analysis organic waste fertilizer material with an aqueous ammoniacal solution comprising ammonia and an acid selected from the group consisting of sulfuric acid and phosphoric acid, the amount of said aqueous ammoniacal solution employed being sufficient to provide ammonia in the amount of about 2 to 20 weight percent of the reaction mixture, the amount of said acid employed being about 2.5 to 6 parts of acid for each part by weight of ammonia in the reaction mixture, granulating the resulting reaction mixture, and recovering the resulting high analysis granular fertilizer product, said admixing and granulating being carried out at temperatures below about 300° F.

2. A high analysis granular fertilizer product comprising the reaction product produced by a method comprising substantially simultaneously admixing a low analysis organic waste fertilizer material selected from the group consisting of industrial organic wastes, sewage sludge, and animal manure with an aqueous ammoniacal solution comprising ammonia and an acid selected from the group consisting of sulfuric acid and phosphoric acid, the amount of said aqueous ammoniacal solution employed being sufficient to provide ammonia in the amount of about 2 to 20 weight percent of the reaction mixture, the amount of said acid employed being about 2.5 to 6 parts of acid for each part by weight of ammonia in the reaction mixture, granulating the resulting reaction mixture, and recovering the resulting high analysis granular fertilizer product, said admixing and granulating being carried out at temperatures below about 300° F.

3. The method according to claim 1 wherein said organic waste material is animal manure.

4. The method according to claim 1 wherein said organic waste material is sewage sludge.

5. The method according to claim 1 wherein said organic waste material is animal manure, said aqueous ammoniacal solution is aqueous ammonia, and said acid is concentrated sulfuric acid.

6. The method according to claim 1 wherein said organic waste material is sewage sludge, said aqueous ammoniacal solution is aqueous ammonia, and said acid is concentrated sulfuric acid.

7. The method according to claim 1 wherein said organic waste material is animal manure, said aqueous ammoniacal solution is an aqueous ammonical ammonium nitrate solution, and said acid is concentrated sulfuric acid.

8. The method according to claim 1 wherein said organic waste material is sewage sludge, said aqueous ammoniacal solution is an aqueous ammonical ammonium nitrate solution, and said acid is concentrated sulfuric acid.

9. The method according to claim 1 wherein said aqueous ammoniacal solution contains at least 15 weight percent free ammonia.

10. The method according to claim 1 wherein said organic waste material is preliminarily admixed with supplemental solid inorganic fertilizer material.

11. The method according to claim 10 wherein said supplemental solid inorganic fertilizer material is selected from the group consisting of superphosphate, triple superphosphate, and muriate of potash and mixtures thereof.

12. A method of producing a high analysis granular fertilizer, which comprises grinding low analysis organic waste fertilizer material selected from the group consisting of sewage sludge and animal manure, adjusting the moisture content of the ground low analysis organic waste fertilizer material to about 5 to 15 weight percent, substantially simultaneously admixing said low analysis organic waste fertilizer material with an aqueous ammoniacal solution comprising ammonia and an acid selected from the group consisting of sulfuric acid having a concentration of about 93 to 100 percent and phosphoric acid having a concentration of about 78 to 85 percent, the amount of said low analysis organic waste fertilizer material employed being sufficient to provide about 15 to 75 weight percent on a dry basis of the reaction mixture, the amount of said aqueous ammoniacal solution employed being sufficient to provide ammonia in the amount of about 2 to 20 weight percent of the reaction mixture, the amount of said acid employed being about 2.5 to 6 parts of acid for each part by weight of ammonia in said reaction mixture, granulating the resulting reaction mixture, and recovering the resulting high analysis granular fertilizer product, said admixing and granulating being carried out at temperatures below about 300° F.

References Cited in the file of this patent

UNITED STATES PATENTS

| | | |
|---|---|---|
| 847,749 | Ellis | Mar. 19, 1907 |
| 1,771,494 | Krumm | July 29, 1930 |
| 1,978,102 | Clapp | Oct. 23, 1934 |
| 2,027,766 | Davis et al. | Jan. 14, 1936 |
| 2,498,480 | Bierlich | Feb. 21, 1950 |
| 2,574,027 | Farber | Nov. 6, 1951 |
| 2,639,231 | Snow | May 19, 1953 |
| 2,827,368 | Mortenson et al. | Mar. 18, 1958 |
| 2,829,040 | Darin et al. | Apr. 1, 1958 |